(12) United States Patent
Yamano et al.

(10) Patent No.: US 12,102,909 B2
(45) Date of Patent: Oct. 1, 2024

(54) INFORMATION PROCESSING APPARATUS AND INFORMATION PROCESSING METHOD

(71) Applicant: SONY GROUP CORPORATION, Tokyo (JP)

(72) Inventors: Ikuo Yamano, Tokyo (JP); Ayumi Nakagawa, Tokyo (JP); Yusuke Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 246 days.

(21) Appl. No.: 17/310,234

(22) PCT Filed: Jan. 23, 2020

(86) PCT No.: PCT/JP2020/002373
§ 371 (c)(1),
(2) Date: Jul. 27, 2021

(87) PCT Pub. No.: WO2020/162210
PCT Pub. Date: Aug. 13, 2020

(65) Prior Publication Data
US 2022/0134221 A1    May 5, 2022

(30) Foreign Application Priority Data
Feb. 4, 2019 (JP) .................... 2019-017859

(51) Int. Cl.
*A63F 13/285* (2014.01)
*G06F 3/01* (2006.01)

(52) U.S. Cl.
CPC ............ *A63F 13/285* (2014.09); *G06F 3/016* (2013.01); *A63F 2300/1037* (2013.01)

(58) Field of Classification Search
CPC ........... A63F 13/285; A63F 2300/1037; G06F 3/016; G06F 2203/013
See application file for complete search history.

(56) References Cited

U.S. PATENT DOCUMENTS

2014/0375602 A1   12/2014   Fujiune
2016/0202760 A1*   7/2016   Churikov .............. G06F 3/0416
                                                        345/173

(Continued)

FOREIGN PATENT DOCUMENTS

CN    107665051 A    2/2018
CN    109416584 A    3/2019

(Continued)

OTHER PUBLICATIONS

International Search Report and Written Opinion of PCT Application No. PCT/JP2020/002373, dated Mar. 24, 2020, 09 pages of ISRWO.

*Primary Examiner* — Peter J Iannuzzi
(74) *Attorney, Agent, or Firm* — CHIP LAW GROUP

(57) ABSTRACT

Provided is an information processing apparatus that includes a generation unit that generates, on the basis of characteristic information items of a plurality of haptic presentation units having different characteristics, preparation information items to be used by the plurality of haptic presentation units to perform haptic presentation to a user. The plurality of haptic presentation units having different characteristics performs the haptic presentation to the user on the basis of the preparation information items generated on the basis of the characteristic information items of the plurality of haptic presentation units.

13 Claims, 18 Drawing Sheets

(56) References Cited

U.S. PATENT DOCUMENTS

| | | | |
|---|---|---|---|
| 2018/0033262 A1 | 2/2018 | Shah et al. | |
| 2019/0196596 A1 | 6/2019 | Yokoyama et al. | |
| 2019/0378382 A1* | 12/2019 | Khoshkava | G06F 3/016 |
| 2020/0051407 A1 | 2/2020 | Nakagawa et al. | |

FOREIGN PATENT DOCUMENTS

| | | |
|---|---|---|
| EP | 3483701 A1 | 5/2019 |
| JP | 2009-119125 A | 6/2009 |
| JP | 2015-028766 A | 2/2015 |
| JP | 2018-026121 A | 2/2018 |
| KR | 10-2018-0012716 A | 2/2018 |
| KR | 10-2019-0025844 A | 3/2019 |
| WO | 2018/008217 A1 | 1/2018 |
| WO | 2018/193513 A1 | 10/2018 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/002373 filed on Jan. 23, 2020, which claims priority benefit of Japanese Patent Application No. JP 2019-017859 filed in the Japan Patent Office on Feb. 4, 2019. Each of the above-referenced applications is hereby incorporated herein by reference in its entirety.

TECHNICAL FIELD

The present technology relates to an information processing apparatus, an information processing method, and a program that executes information processing for haptic presentation.

BACKGROUND ART

In recent years, an input apparatus equipped with a haptic device such as a vibration motor is known as an input apparatus such as a game controller. In such an input apparatus, a haptic sensation such as vibration is fed back to a user in response to a user operation in content such as a game, and thus a user can enjoy a high sense of reality.

For example, Patent Literature 1 discloses, as a well-known technology relating to such an input apparatus equipped with a haptic device, a technology relating to a game controller capable of giving a user a virtual experience of the number of projectiles launched from a gun of a game character and the interval between the launched projectiles by disposing a vibrator such as an eccentric motor and a voice coil motor in a grip portion that can be held by a user and controlling the frequency at which the vibrator is driven, and of giving a user a virtual experience of the size and power of a gun by controlling the magnitude of the vibration.

CITATION LIST

Patent Literature

Japanese Patent Application Laid-open No. 2009-119125

DISCLOSURE OF INVENTION

Technical Problem

However, there is room for improvements in the existing game controller in terms of improving the quality of vibration presented to a user.

In view of the circumstances as described above, it is an object of the present technology to provide an information processing apparatus, an information processing method, and a program that are capable of improving the quality of haptic presentation to be presented to a user.

Solution to Problem

In order to achieve the above-mentioned object, an information processing apparatus according to the present technology includes: a generation unit that generates, on the basis of characteristic information items of a plurality of haptic presentation units having different characteristics, preparation information items to be used by the plurality of haptic presentation units to perform haptic presentation to a user.

In accordance with the information processing apparatus according to the present technology, the plurality of haptic presentation units having different characteristics performs haptic presentation to the user on the basis of the preparation information items generated on the basis of the characteristic information items of the plurality of haptic presentation units, and thus, it is possible to improve the quality of haptic presentation.

The generation unit may be configured to generate, on the basis of the characteristic information items, the preparation information for at least one haptic presentation unit of the plurality of haptic presentation units such that common haptic presentation is performed between the plurality of haptic presentation units.

The characteristic of the haptic presentation unit may be a frequency characteristic.

The preparation information may include a parameter for adjustment to a command value for controlling the haptic presentation unit.

The preparation information may include an inverse function of the characteristic of the haptic presentation unit.

At least one of the plurality of haptic presentation units may be a linear vibration actuator, more specifically, a voice coil motor.

The generation unit may be configured to adjust, on the basis of the preparation information, a command value for at least one haptic presentation unit of the haptic presentation units such that haptic presentation of a sense of movement is performed between the plurality of haptic presentation units.

The information processing apparatus may further include a main body including two grip portions that can be held by a user, in which the plurality of haptic presentation units may be individually disposed on the plurality of grip portions. Alternatively, the information processing apparatus may further include a plurality of independent main bodies each including a grip portion that can be held by a user, in which the plurality of haptic presentation units may be individually disposed on the grip portions of the plurality of main bodies.

Further, the generation unit may be configured to generate, on the basis of the characteristic information, the preparation information for at least one haptic presentation unit of the plurality of haptic presentation units such that common haptic presentation is performed in a middle of presentation of a sense of movement in which a haptic presentation position continuously changes among the plurality of haptic presentation units.

Further, the generation unit may be configured to adjust, on the basis of the preparation information, a command value for at least one haptic presentation unit of the plurality of haptic presentation units such that haptic presentation at a particular frequency by at least one haptic presentation unit of the haptic presentation units is suppressed.

The particular frequency may be a resonant frequency of the at least one haptic presentation unit.

An information processing method according to a second aspect of the present technology includes: generating, on a basis of characteristic information items of a plurality of haptic presentation units having different characteristics, preparation information items to be used by the plurality of haptic presentation units to perform haptic presentation to a user.

A program according to a third aspect of the present technology causes a computer to function as a generation unit that generates, on the basis of characteristic information items of a plurality of haptic presentation units having different characteristics, preparation information items to be used by the plurality of haptic presentation units to perform haptic presentation to a user.

MODE(S) FOR CARRYING OUT THE INVENTION

Hereinafter, embodiments of the present technology will be described with reference to the drawings.

Note that in the present specification and drawings, components having substantially the same functional configurations will be denoted by the same reference symbols and overlap descriptions thereof will be omitted.

<1. Overview of Information Processing Apparatus According to Present Technology>

First, an overview of an information processing apparatus according to the present technology will be described with reference to FIG. 1.

Figure 1:
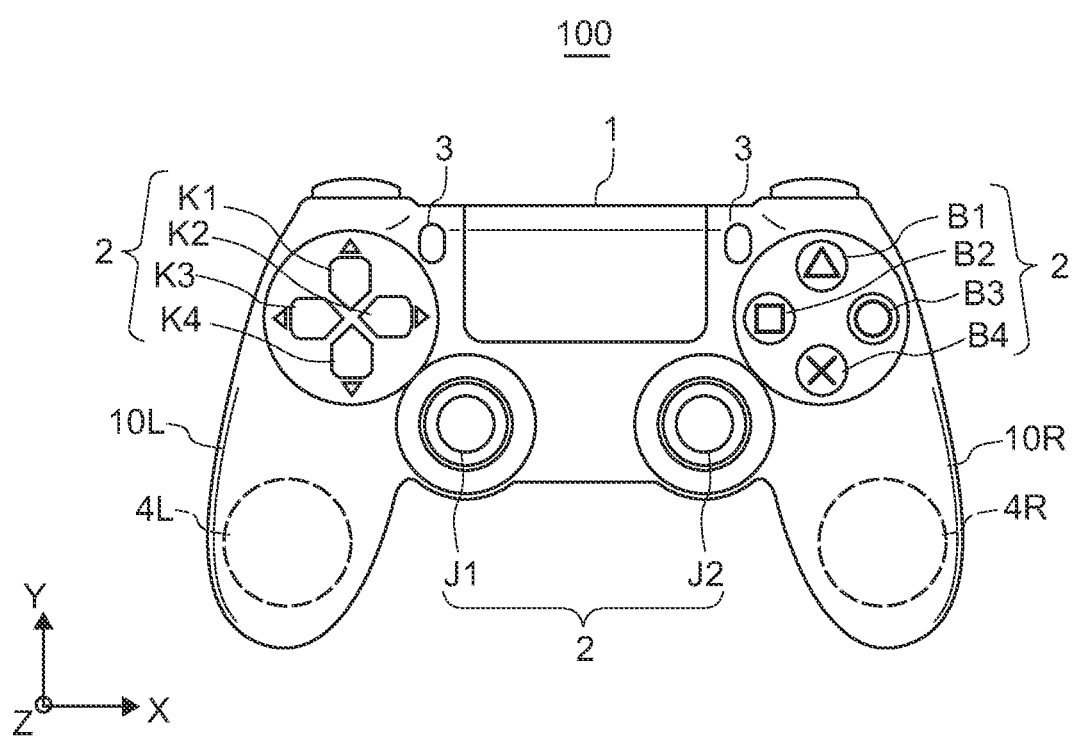
FIG. 1 is an explanation diagram showing a configuration of a game controller that is an information processing apparatus according to a first embodiment of the present technology.

FIG. 1 is an explanation diagram showing an overview of the information processing apparatus according to the present technology. As shown in FIG. 1, an information processing apparatus 100 according to the present technology assumes a game controller, and includes a base portion 1 and a pair of grip portions 10R and 10L. The pair of grip portions 10R and 10L are configured to be held by the right hand and the left hand of a user at the right and left ends of the base portion 1. Note that the present technology is not necessarily limited to a game controller.

The base portion 1 is provided with, for example, operation units 2 including operation buttons B1, B2, B3, and B4, joysticks J1 and J2, and directional keys K1, K2, K3, and K4, and a light-emitting unit 3 using an LED (Light Emitting Diode) or the like. Haptic presentation units 4R and 4L are respectively mounted on the pair of grip portions 10R and 10L.

Note that the haptic presentation units 4R and 4L each include a linear vibration actuator capable of giving haptic presentation by physical movement to a user. More specifically, a vibrator such as an eccentric motor and a voice coil motor capable of giving haptic presentation by vibration, an actuator capable of giving haptic presentation by pressure, an LRA (Linear Resonant Actuator), an actuator using a piezoelectric element, or the like can be used. Note that in this embodiment, a case where a vibrator such as a voice coil motor is used will be described.

As the right and left haptic presentation units 4R and 4L, actuators having different characteristics, e.g., different frequency characteristics, are employed. Herr, a case where voice coil motors having different frequency characteristics are used as the right and left haptic presentation units 4R and 4L is assumed. The right and left haptic presentation units 4R and 4L are both configured to vibrate in the same direction.

Figure 2:
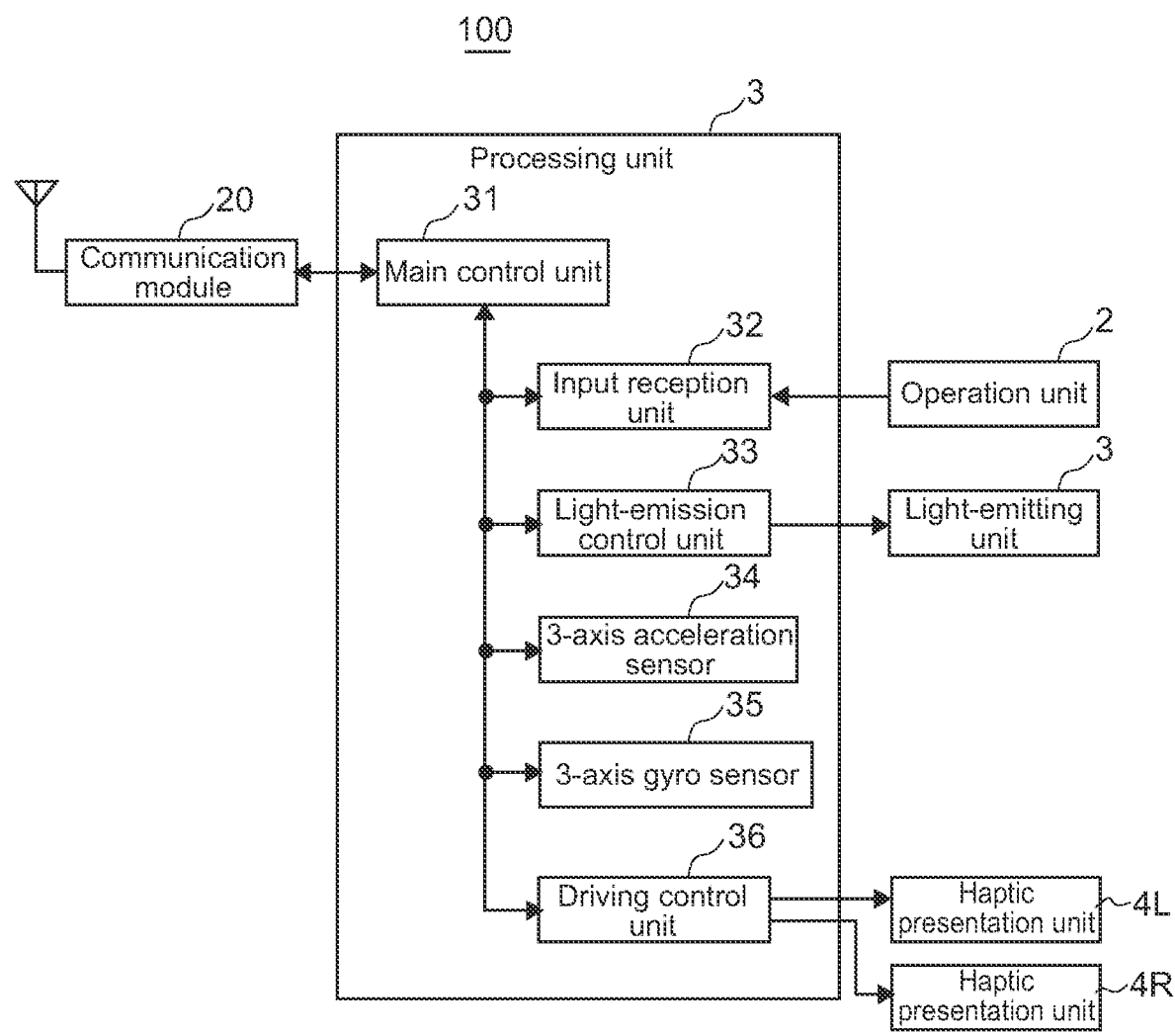
FIG. 2 is a block diagram showing a hardware configuration of the information processing apparatus in FIG. 1

FIG. 2 is a block diagram showing a hardware configuration of this information processing apparatus.

The information processing apparatus 100 according to the present technology includes a communication module 20, a processing unit 30, the light-emitting unit 3, and the two haptic presentation units 4R and 4L.

The communication module 20 is a module that performs communication with a host device such as a game console body, and the communication may be wired communication or wireless communication.

The communication module 20 is a module that performs communication with a host device such as game console body, and the communication may be wired communication or radio communication.

The processing unit 30 includes a main control unit 31 (corresponding to the "generation unit" in the claims), an input reception unit 32, a light-emission control unit 33, a 3-axis acceleration sensor 34, a 3-axis gyro sensor 35, and a driving control unit 36. The main control unit 31, the input reception unit 32, the light-emission control unit 33, the driving control unit 36, and the like each include a CPU (Central Processing Unit), a memory, another circuit, or the like. The memory stores a control program or the like executed by the CPU.

The main control unit 31 performs control of the input reception unit 32, the light-emission control unit 33, the 3-axis acceleration sensor 34, the 3-axis gyro sensor 35, and the driving control unit 36, and transmits and receives data such as vibration data to/from the communication module 20.

The input reception unit 32 detects that a user has operated the operation buttons B1, B2, B3, and B4, the joysticks J1 and J2, the directional keys K1, K2, K3, and K4, and the like, which are the operation units 2, and transmits the detected operation signal to the main control unit 31. The main control unit 31 supplies the operation signal received by the input reception unit 32 to the communication module 20. The communication module 20 transmits the operation signal supplied from the input reception unit 32 to the host device.

The main control unit 31 notifies, on the basis of information for designating the light-emitting color of the light-emitting unit 3 received from the host device via the communication module 20, the light-emission control unit 33 of the light-emitting color. The light-emission control unit 33 controls the light emission (turning on) of the light-emitting unit 3 on the basis of the notification of the light-emitting color.

The 3-axis acceleration sensor 34 detects an acceleration component in the 3-axis directions of XYZ of the information processing apparatus 100.

The 3-axis gyro sensor 35 detects angular velocity in the XZ plane, the ZY plane, and the YX plane.

The main control unit 31 receives the detection value from the 3-axis acceleration sensor 34 and the 3-axis gyro sensor 35, and transmits information regarding the detection value to the host device such as a game console using the communication module 20.

Further, the main control unit 31 generates, on the basis of characteristic information items such as frequency characteristics of the right and left haptic presentation units 4R and 4L, preparation information items to be used by the right and left haptic presentation units 4R and 4L to perform haptic presentation to a user. This preparation information is information for adjusting a vibration command value in a game program for at least one haptic presentation unit of the right and left haptic presentation units 4R and 4L such that common haptic presentation is performed in the right and left haptic presentation units 4R and 4L. A specific method of generating the preparation information will be described below. The main control unit 31 adjusts, on the basis of the above-mentioned preparation information items, the vibration command values for at least one haptic presentation unit of the right and left haptic presentation units 4R and 4L included in the vibration data received from the host device via the communication module 20, and supplies the respective vibration command value to the driving control unit 36. The driving control unit 36 respectively supplies the drive signals corresponding to the right and left vibration command values supplied from the main control unit 31 to the right and left haptic presentation units 4R and 4L.

(Frequency Characteristics of Right and Left Haptic Presentation Units 4R and 4L)

Here, frequency characteristic are illustrated as different characteristics between the right and left haptic presentation units 4R and 4L, and the difference between the frequency characteristics will be described.

Figure 3:
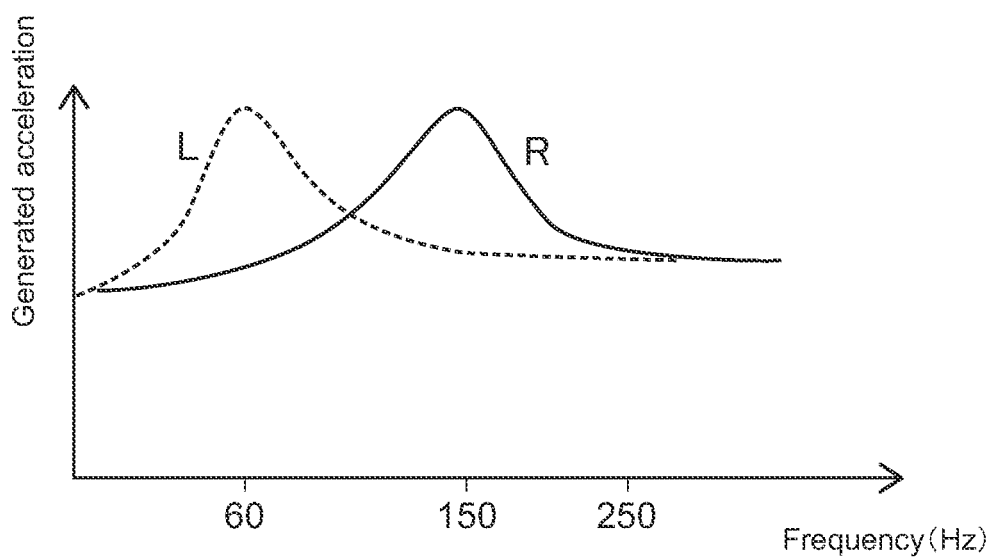
FIG. 3 is a graph showing frequency characteristics of right and left haptic presentation units of the information processing apparatus in FIG. 1.

FIG. 3 is a graph showing the frequency characteristics of the right and left haptic presentation units 4R and 4L. In this graph, the horizontal axis represents the frequency, and the vertical axis represents the generated acceleration. Actually, the vibration command values for the right and left haptic presentation units 4R and 4L are given by a combination of values of the amplitude of the Sin wave and the frequency or the waveform data having a free shape including positive and negative vibrations. However, for the sake of simplicity of description, only the frequency characteristics, which represent the relationship between the frequency and the generated acceleration, are shown in the graph.

Note that in the graph, L represents the frequency characteristic of the haptic presentation unit 4L on the left side and R represents the frequency characteristic of the haptic presentation unit 4R on the right side.

Here, the resonant frequency of the haptic presentation unit 4L on the left side on the left side is 60 Hz, and the resonant frequency of the haptic presentation unit 4R on the right side is 150 Hz. That is, in the right and left haptic presentation units 4R and 4L, the frequency characteristic differs. Note that in the right and left haptic presentation units 4R and 4L, the generated acceleration at 250 Hz or higher is substantially the same.

By employing those having different frequency characteristics as the right and left haptic presentation units 4R and 4L in this way, it is possible to expand the expression of the haptic presentation more than when right and left haptic presentation units having the same frequency characteristic are used as described below.

Figure 4:
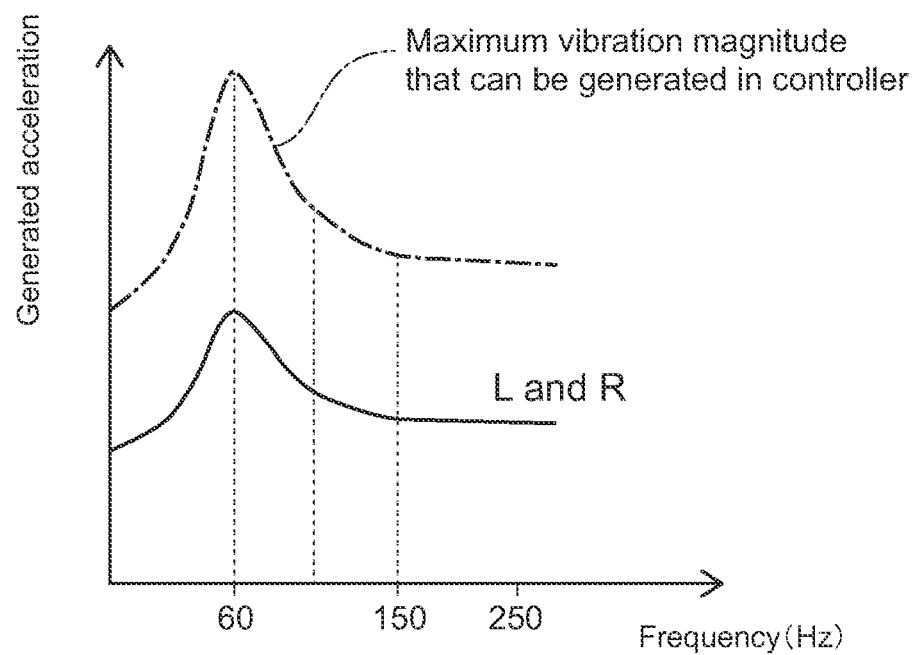
FIG. 4 is a graph showing a relationship between the generated acceleration and frequency of a controller employing the right and left haptic presentation units having the same frequency characteristic.

First, the relationship between the generated acceleration and the frequency in the case where the right and left haptic presentation units 4R and 4L having the same frequency characteristic are used is shown in FIG. 4.

In the case where the right and left haptic presentation units 4R and 4L having the same frequency characteristic are employed as described above, when the same vibration command value is input to each of the right and left haptic presentation units 4R and 4L, both the right and left haptic presentation units 4R and 4L vibrate at the same acceleration, and haptic presentation by vibration without bias between the right and left is given to a user. Control of each of the haptic presentation units 4R and 4L by inputting the same driving command value to the right and left haptic presentation units 4R and 4L in this way is referred to as the "right-and-left interlocking control". In accordance with this right-and-left interlocking control, by simultaneously driving the right and left haptic presentation units 4R and 4L at the frequency close to the resonant frequency of the haptic presentation units 4R and 4L, it is possible to generate strong vibration using the capabilities of the two haptic presentation units 4R and 4L as much as possible (characteristics indicated by a single dotted-dashed line). For this reason, it is useful for presenting, for example, "a sense of a gun firing" in a game program.

Meanwhile, control of each of the haptic presentation units 4R and 4L by inputting different vibration command values to the right and left haptic presentation units 4R and 4L is referred to as the "right-and-left independent control".

Figure 5:
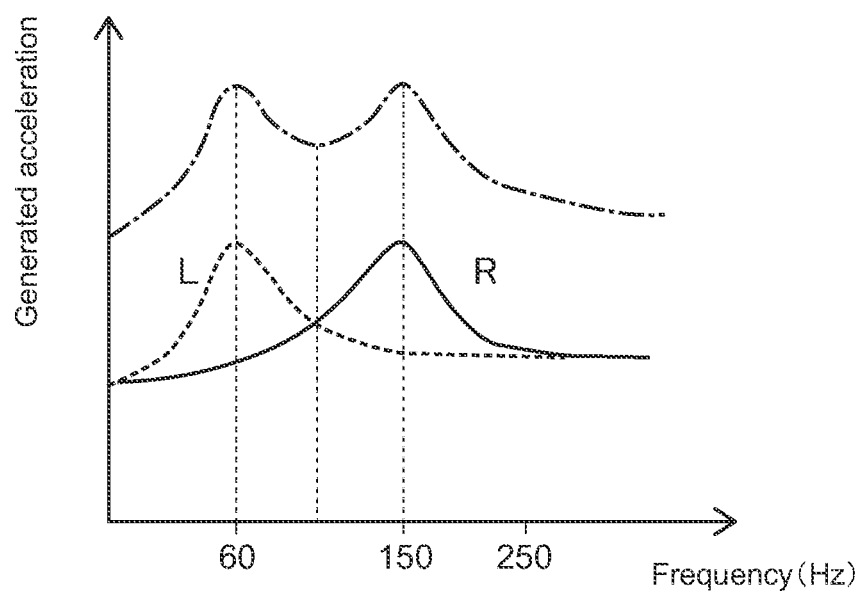
FIG. 5 is a graph showing a relationship between the generated acceleration and frequency of a controller employing the right and left haptic presentation units having different frequency characteristics.

FIG. 5 is a graph showing a relationship between the generated acceleration and frequency of a controller employing the right and left haptic presentation units 4R and 4L having different frequency characteristics as in this embodiment.

In the case where the right and left haptic presentation units 4R and 4L having different frequency characteristics are employed, when the same vibration command value is input to each of the right and left haptic presentation units 4R and 4L (at the time of the right-and-left interlocking control), different vibration acceleration is generated between the right and left, and thus, it is possible to generate sufficient combined vibration in a wider frequency range.

Figure 6:
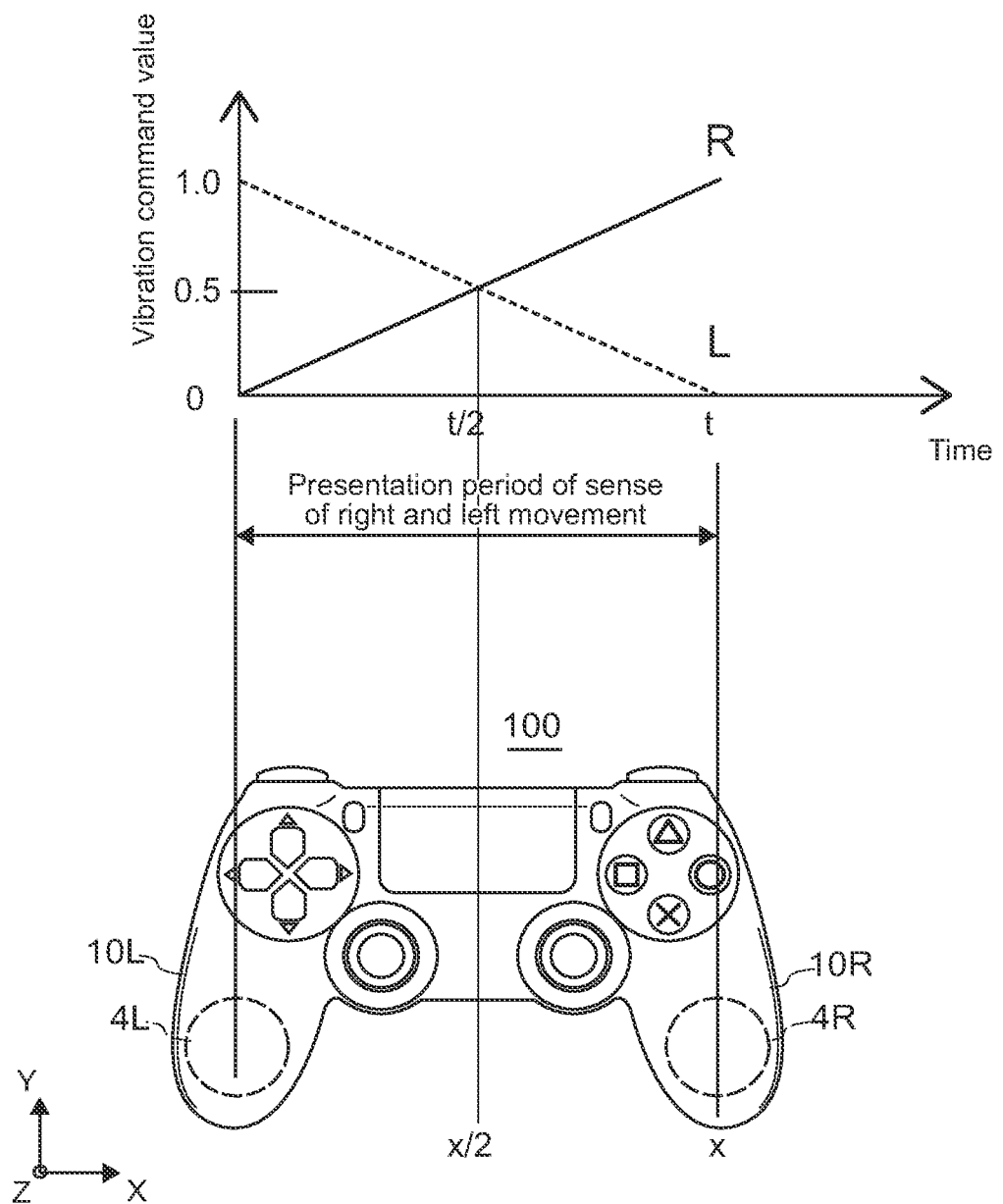
FIG. 6 is a diagram describing a method of presenting a sense of right and left movement in the controller employing the right and left haptic presentation units having different frequency characteristics.

Further, for example, as shown in FIG. 6, it is possible to present, to a user, the "sense of right and left movement" for moving the stereotactic position of vibration as a feeling to the right and left (X direction) by changing the balance of the generated acceleration of the right and left haptic presentation units 4R and 4L with time.

However, in the case where a sense of gun firing or the like in a game program is presented by vibration of the right and left haptic presentation units 4R and 4L, there is a possibility that the difference of the generated acceleration between the right and left gives a sense of discomfort to a user when the same command value is input to each of the right and left haptic presentation units 4R and 4L (at the time of the right-and-left interlocking control).

Further, in the case of presenting the sense of right and left movement for moving the stereotactic position of vibration as a feeling to the right and left by changing the balance of the generated acceleration between the right and left as shown in FIG. 6, the following problem may occur.

For example, in order to present the sense of right and left movement, the vibration command value to be given to one (e.g., left) haptic presentation unit 4L is decreased with time, and the vibration command value to be given to the other (e.g., right) haptic presentation unit 4R is continuously increased with time in synchronization with the vibration command value to be given to the one haptic presentation unit 4L. In the case where the right and left vibration command values are continuously decreased/increased, It is possible to present a natural sense of right and left movement if the right and left vibration command values coincide with each other at just the mid-time t/2 of a period t from the start to the end of vibration. However, in the case where the frequency characteristics of the right and left haptic presentation units 4R and 4L differ, the right and left generated accelerations do not coincide with each other at the mid-time of t/2, and thus, a natural sense of right and left movement is not presented.

The information processing apparatus according to the present technology is capable of solving the problem caused due to the different frequency characteristics of the two haptic presentation units 4R and 4L as described above.

Further, the information processing apparatus according to the present technology is capable of solving the above-mentioned problem without requiring a time and labor for generating a vibration command value capable of eliminating the difference of the generated acceleration caused by the difference between the frequency characteristics of the two haptic presentation units 4R and 4L at the stage of game programming.

(Vibration Control Mode)

The information processing apparatus according to the present technology has a mode in which optimization is performed and a mode in which optimization is not performed for each of the above-mentioned right-and-left interlocking control and the above-mentioned right-and-left independent control, i.e., the following four types of modes.

0: right-and-left interlocking mode (without correction)
1: right-and-left interlocking mode (with correction)
2: right-and-left independent mode (without correction)
3: right-and-left independent mode (with correction)

Here, "0" to "3" represent mode flags for identifying modes. The mode with correction represents the mode in which at least one of the right and left vibration command values on a game program is adjusted by preparation information. Meanwhile, the mode without correction represents the mode in which the right and left vibration command values on a game program are used without change.

Figure 7:
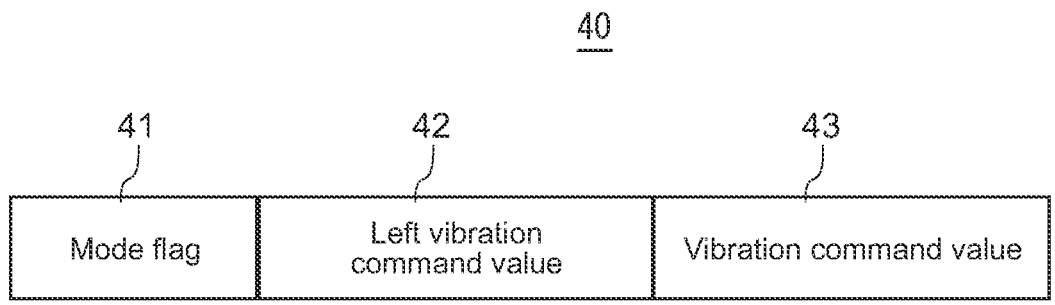
FIG. 7 is a structure diagram of vibration data.

FIG. 7 is a diagram showing a structure of vibration data 40 given from a game program.

The vibration data 40 includes a mode flag 41, a left vibration command value 42, and a vibration command value 43.

The mode flag 41 represents information for designating one of the four modes described above, and can take one value of "0" to "3". The left vibration command value 42 is a vibration designation value for the haptic presentation unit 4L on the left side, and the vibration command value 43 is a vibration designation value for the haptic presentation unit 4R on the right side. The left vibration command value 42 and the vibration command value 43 represent, for example, data for the time of one vibration action on a game program. Each of the left vibration command value 42 and the vibration command value 43 includes a time history (envelope) of the frequency value of vibration and the amplitude value.

Figure 8:
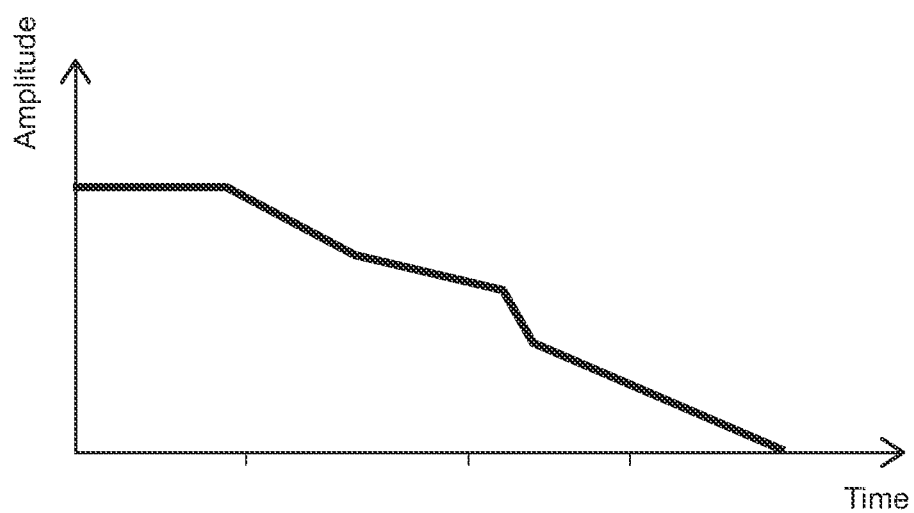
FIG. 8 is a diagram showing an example of a time history of an amplitude value.

FIG. 8 is a diagram showing an example of a time history of the amplitude value. Note that the frequency of vibration is constant between the right and left. As described above, the left vibration command value 42 and the vibration command value 43 include information of the amplitude value that varies with time. It goes without saying that the amplitude value may be constant in one vibration action. Also the frequency of vibration may vary with time similarly.

The main control unit 31 separates the mode flag 41, the left vibration command value 42, and the vibration command value 43 from the vibration data 40 received from the host device via the communication module 20, and determines the mode designated by the vibration data 40 on the basis of the mode flag 41.

(Flow of Overall Operation)

Figure 9:
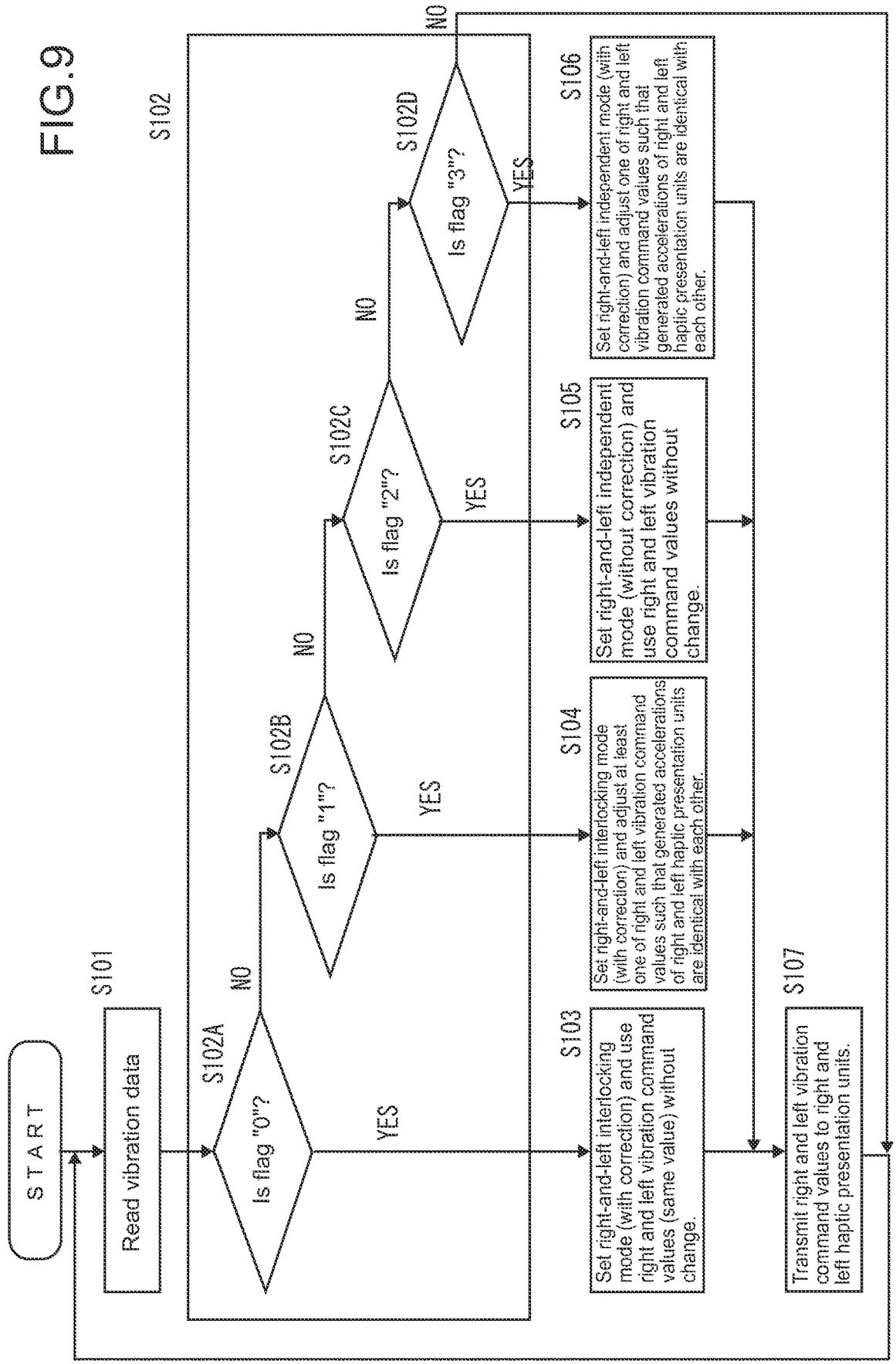
FIG. 9 is a flowchart showing a flow of vibration control by four types of modes from reading of the vibration data according to the present technology.

FIG. 9 is a flowchart showing a flow of vibration control by the four types of modes starting from reading of vibration data.

First, the main control unit 31 determines the value of the mode flag 41 included in the vibration data received from the host device via the communication module 20 (Step S101).

(Right-and-Left Interlocking Mode (without Correction))

In the case where the determined value of the mode flag is "0" (Yes in Step S102A), the main control unit 31 controls the right and left haptic presentation units 4R and 4L in the right-and-left interlocking mode (without correction).

That is, in the right-and-left interlocking mode (without correction), the left vibration command value and the right vibration command value are supplied to the driving control unit 36 such that they are used without change as the vibration command values of the right and left haptic presentation units 4R and 4L for the right and left haptic presentation units 4R and 4L having different frequency characteristics (Step S103).

Figure 10:
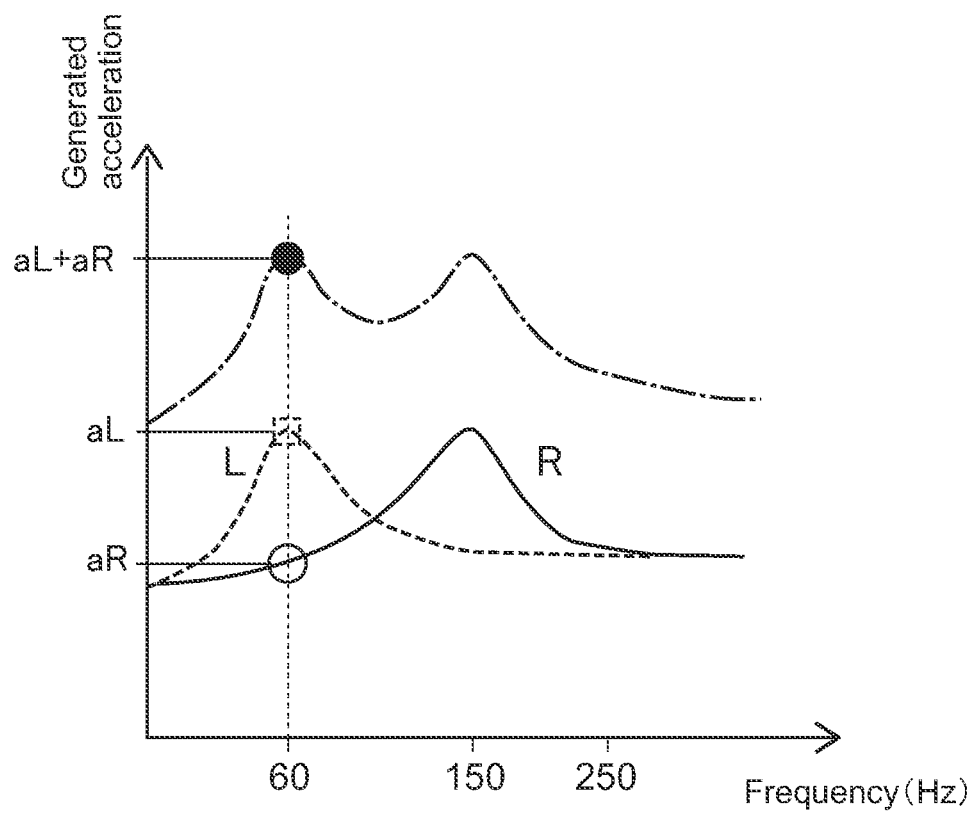
FIG. 10 is a graph showing the generated acceleration and the combined acceleration of each of the right and left haptic presentation units in the case where the vibration command values of the frequency "60 Hz" and the amplitude value "1.0" are given as the left vibration command value and the right vibration command value.

FIG. 10 is a graph showing the generated acceleration and the combined acceleration of each of the right and left haptic presentation units 4R and 4L in the case where the vibration command values of the frequency "60 Hz" and the amplitude value "1.0" are given as the left vibration command value and the right vibration command value. In this case, the acceleration "aL" is generated in the haptic presentation unit 4L on the left side indicated by a dotted line in the graph, the acceleration "aR" is generated in the haptic presentation unit 4R on the right side indicated by a solid line in the graph, and as a result, the acceleration "aL+aR" is generated as a whole. At this time, the acceleration "aL" generated in the haptic presentation unit 4L on the left side is higher than the acceleration "aR" generated in the haptic presentation unit 4R on the right side because of the difference between the frequency characteristics of the right and left haptic presentation units 4R and 4L. Therefore, for example, in haptic presentation of a sense of gun firing, haptic presentation that is not intended by the game designer and has a difference in the generated acceleration between the left and right is performed.

(Right-and-Left Interlocking Mode (with Correction))

In the case where the determined value of the mode flag is "1" (Yes in Step S102B), the main control unit 31 controls the right and left haptic presentation units 4R and 4L on the basis of the left vibration command value and the right vibration command value in the right-and-left interlocking mode (with correction).

Figure 11:
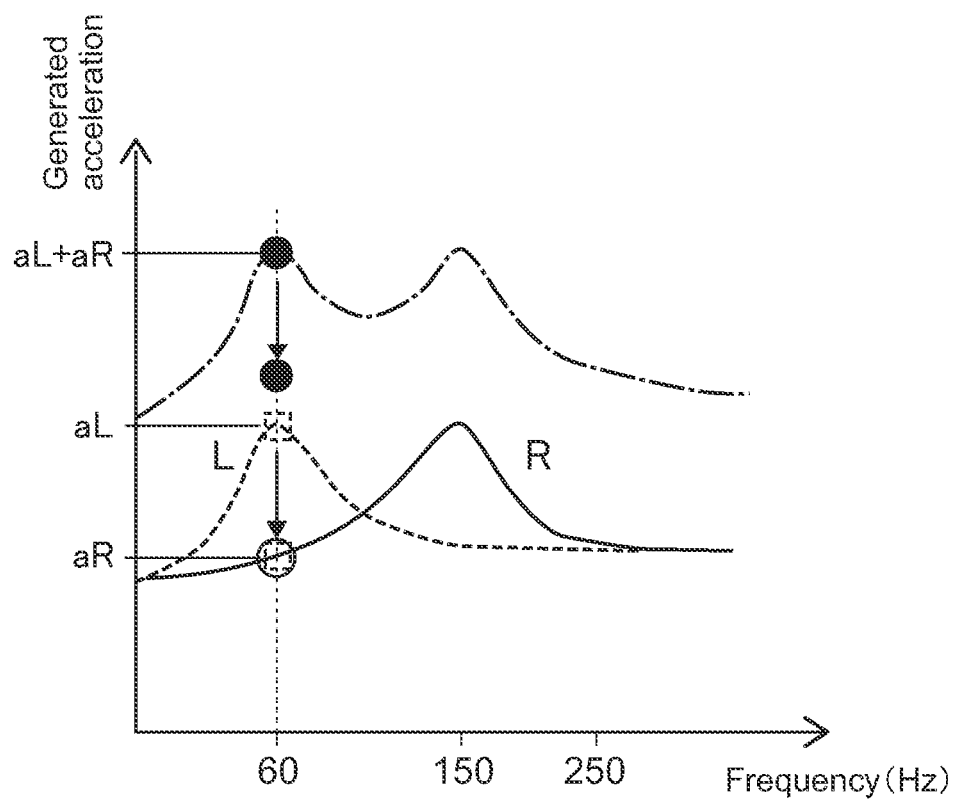
FIG. 11 is a graph showing a change in acceleration by adjustment based on preparation information for the left vibration command value shown in FIG. 10.

In the right-and-left interlocking mode (with correction), the vibration command value common to the right and left is given as each of the left vibration command value and the right vibration command value for the right and left haptic presentation units 4R and 4L having different frequency characteristics. The main control unit 31 adjusts, on the basis of the above-mentioned preparation information, the vibration command value for at least one haptic presentation unit of the right and left haptic presentation units 4R and 4L (Step S104). More specifically, for example, as shown in FIG. 11, adjustment for multiplying the vibration command value for the haptic presentation unit (the haptic presentation unit 4L in this example) with higher generated acceleration for the common vibration command value, of the right and left haptic presentation units 4R and 4L, by the preparation information C1 (C1<1) is performed.

Here, the preparation information C1 (C1<1) is generated from information regarding the frequency characteristics of the right and left haptic presentation units 4R and 4L. The preparation information C1 (C1<1) is generated by the following formula with aR and aL as information regarding the frequency characteristics of the right and left haptic presentation units 4R and 4L, for example.

$$aR/aL = C1 \ (C1<1) \quad (1)$$

Figure 12:
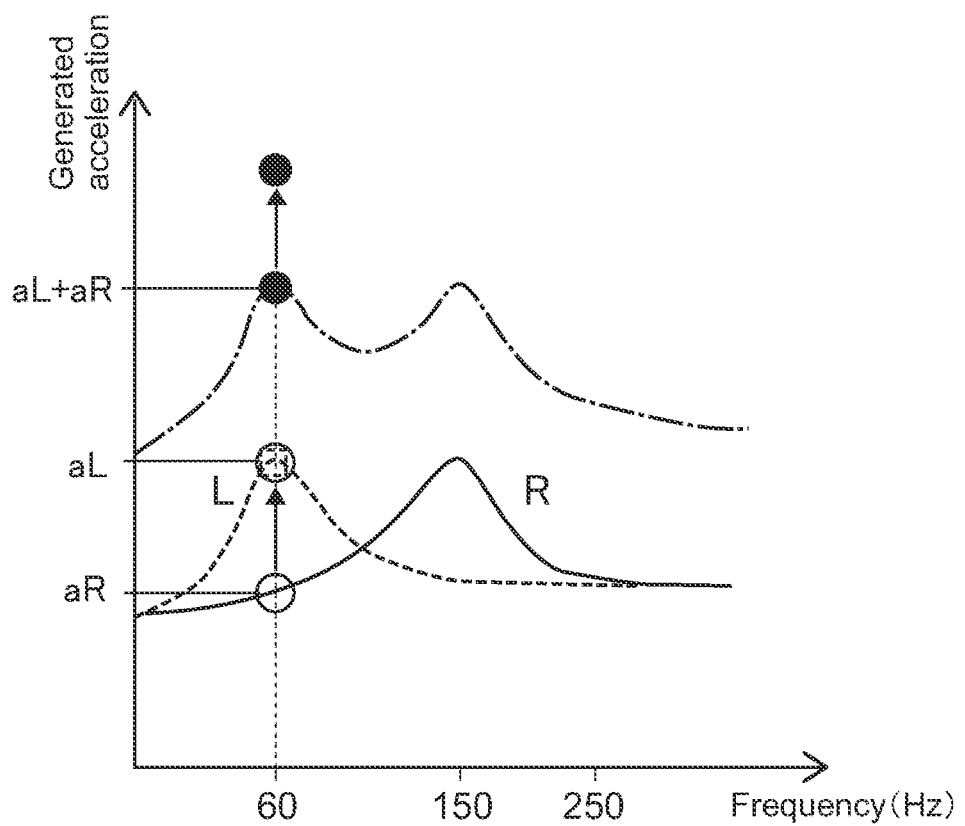
FIG. 12 is a graph showing a change in acceleration by adjustment based on preparation information for the right vibration command value shown in FIG. 10.

Conversely, as shown in FIG. 12, the adjustment of the generated acceleration may be performed by multiplying the vibration command value for the haptic presentation unit (the haptic presentation unit 4R in this example) with lower generated acceleration for the common vibration command value by preparation information C1' (C1'>1) generated by the following formula (2).

$$aL/aR = C1' \ (C1'>1) \quad (2)$$

As a result, even in the case where the vibration data of a game program is not designed considering the difference between the frequency characteristics of the right and left haptic presentation units 4R and 4L, it is possible to vibrate the right and left haptic presentation units 4R and 4L having different frequency characteristics at the same acceleration in the right-and-left interlocking mode by simply setting the value of the mode flag of the vibration data to "1", and give a user haptic presentation as intended by the game designer in presenting a sense of gun firing, for example.

(Operation in Right-and-Left Independent Mode (without Correction))

In the case where the determined value of the mode flag is "2" (YES in Step S102C), the main control unit 31 controls the right and left haptic presentation units 4R and 4L on the basis of the left vibration command value and the right vibration command value in the right-and-left independent mode (without correction).

For example, as shown in FIG. 6, the vibration command value (amplitude value) to be given to the haptic presentation unit 4L on the left side is "1.0" and the vibration command value (amplitude value) to be given to the haptic presentation unit 4R on the right side is "0" at the time when presentation of a sense of right and left movement is started, and the vibration command value (amplitude value) to be given to the haptic presentation unit 4L on the left side is "0" and the vibration command value (amplitude value) to be given to the haptic presentation unit 4R on the right side is "1.0" at the time immediately before the presentation of a sense of right and left movement is finished. Further, both the right and left vibration command values (amplitude values) at the mid-time t/2 of the period of the presentation of a sense of right and left movement are "0.5".

In the right-and-left independent mode (without correction), the main control unit 31 supplies the left vibration command value and the right vibration command value on a game program to the driving control unit 36 such that they are used without change as the vibration command values of the right and left haptic presentation units 4R and 4L (Step S105).

Figure 13:
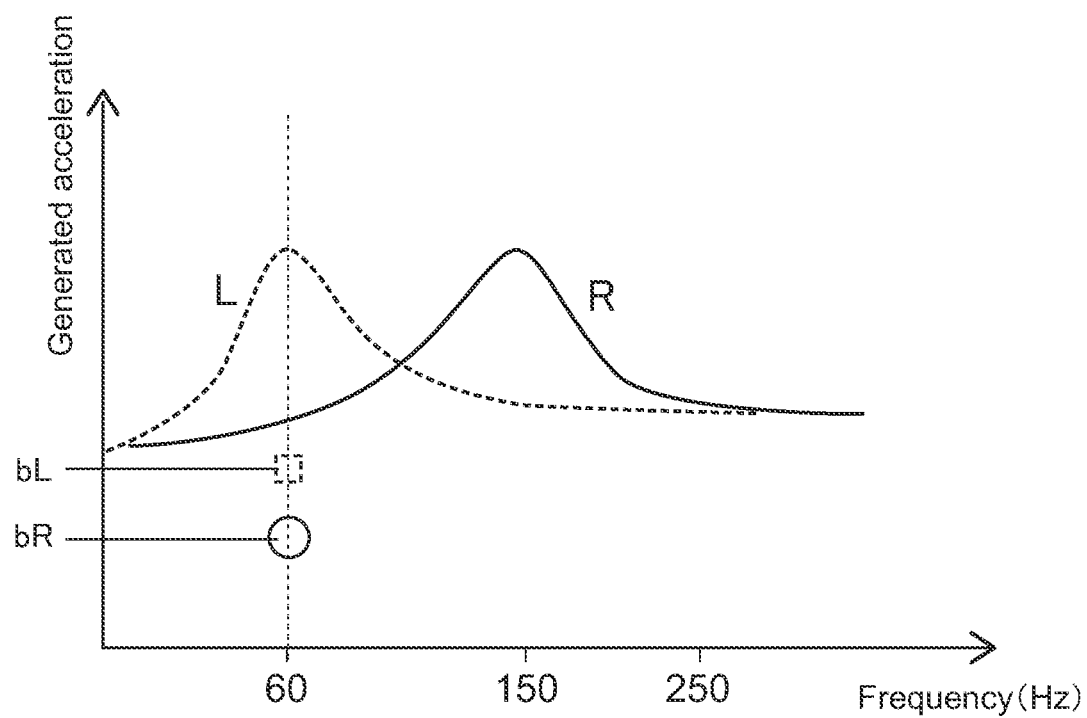
FIG. 13 is a graph showing the acceleration generated in the right and left haptic presentation units at the mid-time of the presentation period in the presentation of the sense of right and left movement.

Then, as shown in the graph in FIG. 13, at the mid-time t/2 of the period of the presentation of a sense of right and left movement, the acceleration "bL" is generated in the haptic presentation unit 4L on the left side and the acceleration "bR" is generated in the haptic presentation unit 4R on the right side. At this time, due to the difference between the frequency characteristics of the right and left haptic presentation units 4R and 4L, the acceleration "bL" generated in one, e.g., the haptic presentation unit 4L on the left side is higher than the acceleration "bR" generated in the other, e.g., the haptic presentation unit 4R on the right side. That is, at the mid-time t/2 of the period of the presentation of a sense of right and left movement, a difference between the generated accelerations of the right and left haptic presentation units 4R and 4L, and a natural sense of right and left movement is not presented.

(Right-and-Left Independent Mode (with Correction))

In the case where the determined value of the mode flag 41 is "3" (Yes in Step S102D), the main control unit 31 controls the right and left haptic presentation units 4R and 4L on the basis of the left vibration command value and the right vibration command value in the right-and-left independent mode (with correction).

Figure 14:
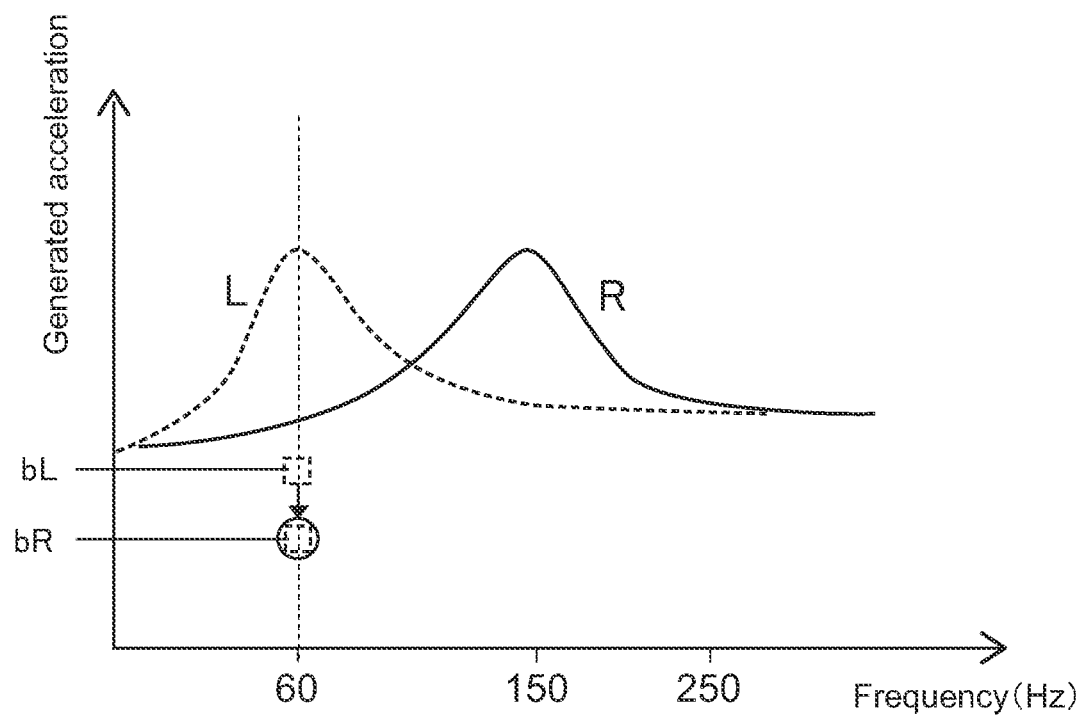
FIG. 14 is a graph showing a change in acceleration by adjustment based on preparation information for the left vibration command value shown in FIG. 13.

In the right-and-left independent mode (with correction), the main control unit 31 adjusts, on the basis of the preparation information, the vibration command value for at least one haptic presentation unit of the right and left haptic presentation units 4R and 4L. More specifically, for example, as shown in FIG. 14, adjustment for multiplying the vibration command value for the haptic presentation unit (the haptic presentation unit 4L on the left side in this example) with higher generated acceleration for the common vibration command value "0.5", of the right and left haptic presentation units 4R and 4L, by the preparation information C2 (C2<1) is performed (Step S106).

The preparation information C2 (C2<1) is generated by, for example, the following formula from information items (bR and bL) regarding the frequency characteristics of the right and left haptic presentation units 4R and 4L.

$$bR/bL = C2 \ (C2<1) \qquad (3)$$

Here, bR represents the generated acceleration in the case where "0.5" as a vibration command value is given to the haptic presentation unit 4R on the right side, and bL represents the generated acceleration in the case where "0.5" as a vibration command value is given to the haptic presentation unit 4L on the left side.

Figure 15:
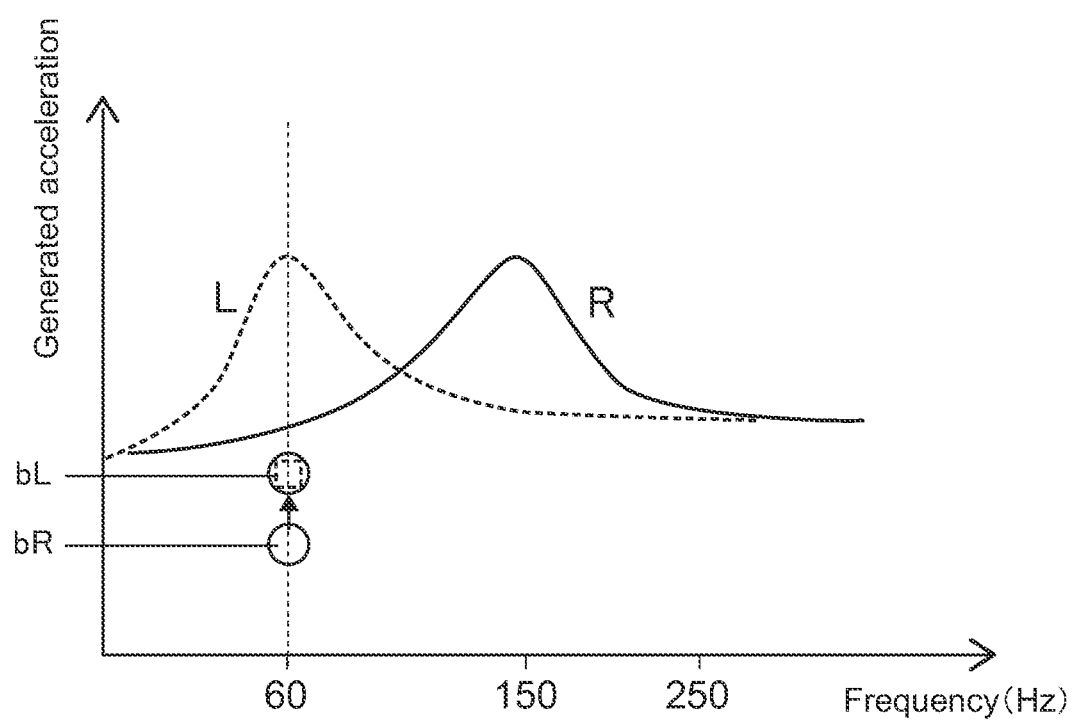
FIG. 15 is a graph showing a change in acceleration by adjustment based on preparation information for the right vibration command value shown in FIG. 13.

Conversely, as shown in FIG. 15, adjustment for multiplying the vibration command value for the haptic presentation unit (the haptic presentation unit 4R on the right side in this example) with lower generated acceleration for the vibration command value "0.5", of the right and left haptic presentation units 4R and 4L, by preparation information C2" (C2">1) generated by the following formula (4) is performed.

$$bL/bR = C2" \ (C2">1) \qquad (4)$$

As a result, even in the case where the vibration data of a game program is not designed considering the difference between the frequency characteristics of the right and left haptic presentation units 4R and 4L, it is possible to make, in the presentation of a sense of right and left movement or the like, the generated accelerations of the right and left haptic presentation units 4R and 4L coincide with each other at the mid-time of 2/t of the period of the presentation of a sense of right and left movement by simply setting the value of the mode flag of the vibration data to "3", and present a natural sense of right and left movement to a user, for example.

(Vibration Data in Another Format)

Although the vibration data is represented by the frequency of vibration and the time history of the amplitude value in the example described above, vibration data that directly designates the amplitude of each time without designating the frequency may be used as another format for representing the vibration data. In this case, the vibration data includes various frequencies, and the frequencies cannot be simultaneously determined between the right and left. In this regard, the following processing is performed.

Of the four types of modes described above, in the right-and-left interlocking mode (without correction) and the right-and-left interlocking mode (with correction) in which the same vibration command value is used between the right and left, the vibration data of one of the right and left is used as the right and left vibration data items, and in the right-and-left independent mode (without correction) and the right-and-left independent mode (with correction), the right vibration command value and the left vibration command value are respectively used for the right and left haptic presentation units 4R and 4L. Then, in the right-and-left interlocking mode (with correction) and the right-and-left independent mode (with correction) in which correction is performed, the main control unit 31 performs equalization processing of multiplying the amplitude value of each time by the inverse function of the frequency characteristic of the corresponding haptic presentation unit, which has been generated as preparation information, thereby performing the adjustment.

This makes it possible to eliminate the problem of the quality of haptic presentation caused by the difference between the frequency characteristics of the right and left haptic presentation units 4R and 4L even for the vibration data that directly designates the amplitude of each time without designating the frequency.

Figure 16:
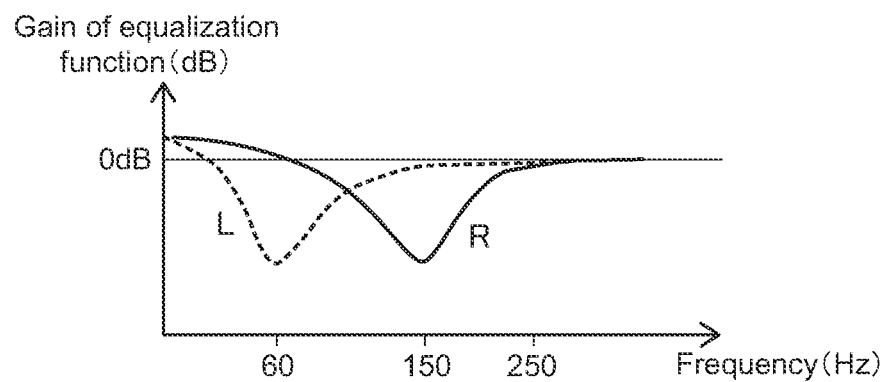
FIG. 16 is a graph showing the equalization characteristic imparted to right and left vibration data items.

FIG. 16 is a graph showing the equalization characteristic that is preparation information. The dotted line represents the equalization characteristic that is an inverse function of the frequency characteristic of the haptic presentation unit 4L on the left side, and the solid line represents the equalization characteristic that is an inverse function of the frequency characteristic of the haptic presentation unit 4R on the right side.

Figure 17:
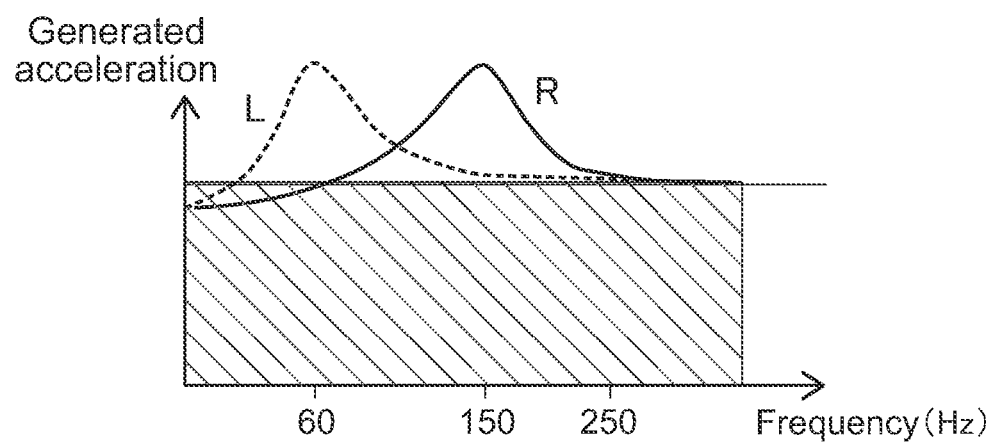
FIG. 17 is a graph showing the range of the generated acceleration of each of the right and left haptic presentation units by imparting the equalization characteristics in FIG. 16.

In the right-and-left interlocking mode (with correction), the main control unit 31 gives, to the amplitude value of each time on the left side, an equalization characteristic that is an inverse function of the frequency characteristic of the haptic presentation unit 4L on the left side indicated by the dotted line in the graph of FIG. 16, and gives, to the amplitude value of each time on the right side, an equalization characteristic that is an inverse function of the frequency characteristic of the haptic presentation unit 4R on the right side indicated by the solid line in the graph of FIG. 16. As a result, the right and left vibration command values capable of causing the generated accelerations of the right and left haptic presentation units 4R and 4L having different frequency characteristics to coincide with each other in the area indicated by hatching in FIG. 17 can be obtained.

As a result, even in the case where the vibration data of a game program represented by the right and left amplitude values of each time is not designed considering the difference between the frequency characteristics of the right and left haptic presentation units 4R and 4L, it is possible to cause the right and left haptic presentation units 4R and 4L having different frequency characteristics to vibrate at the same acceleration in the right-and-left interlocking mode by simply setting the value of the mode flag of the vibration data to "1".

Similarly, also in the right-and-left independent mode (with correction), it is possible to cause the right and left haptic presentation units 4R and 4L having different frequency characteristics to vibrate at the acceleration intended by the game designer by simply setting the value of the mode flag of the vibration data to "3", and present a natural sense of right and left movement to a user.

(Attenuation of Resonant Frequency Components of Vibration)

Further, by multiplying amplitude values to be given to the right and left haptic presentation units 4R and 4L having different resonant frequencies by a gain less than 0 dB, the components close to the resonant frequency may be selectively attenuated (suppressed). As a result, it is possible to make the right and left generated accelerations in the case where the same amplitude value is given to each of the right and left haptic presentation units 4R and 4L close to each other.

Figure 18:
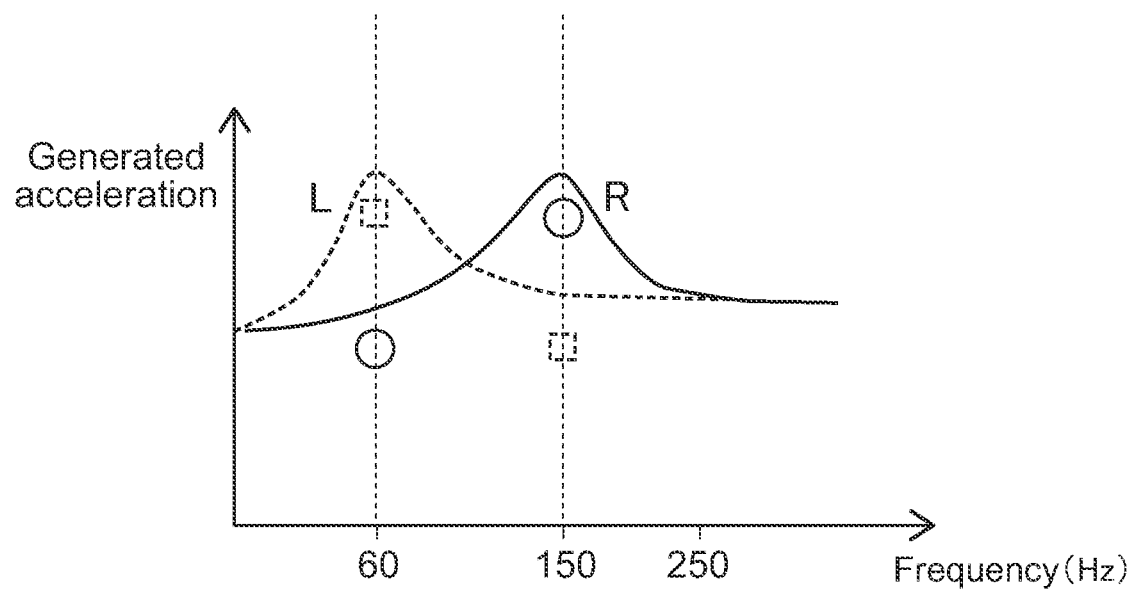
FIG. 18 is a graph showing the generated acceleration of right and left haptic presentation units 4R and 4L in the case where the same amplitude value is given to the right and left haptic presentation units having difference resonance frequencies without change.

FIG. 18 is a graph showing the generated accelerations of the right and left haptic presentation units 4R and 4L in the case where the same amplitude value is given to each of the haptic presentation unit 4L on the left side having the resonant frequency of 60 Hz and the haptic presentation unit 4R on the right side having the resonant frequency of 150 Hz without change.

Figure 19:
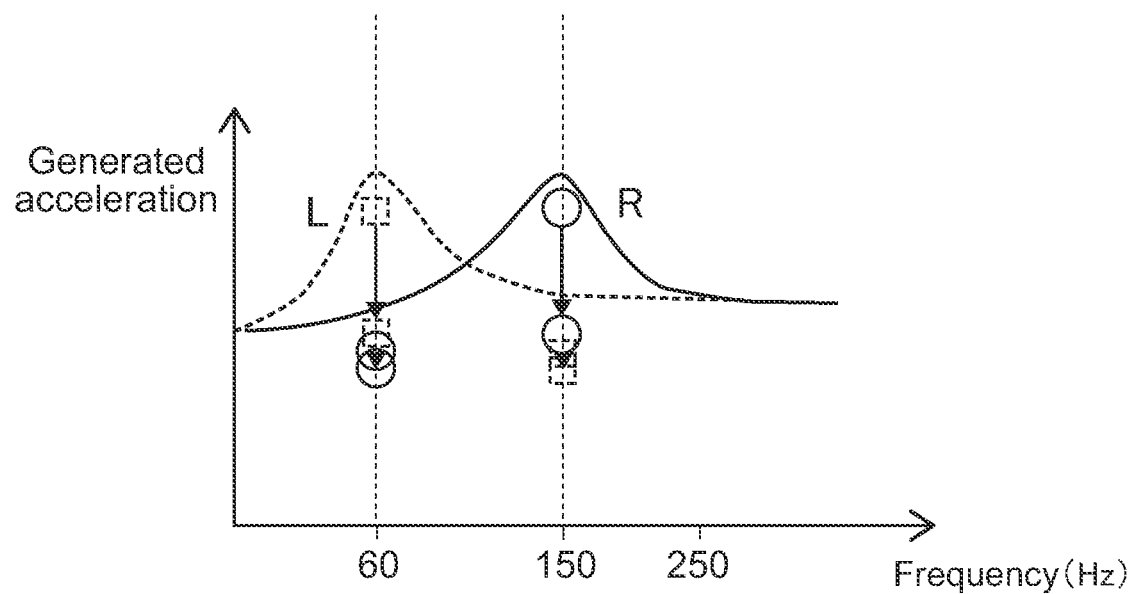
FIG. 19 is a graph showing the generated acceleration of the right and left haptic presentation units 4R and 4L in the case where those obtained by multiplying the amplitude values given to the right and left haptic presentation units 4R and 4L shown in FIG. 18 by the gain of less than 0 dB are given.

FIG. 19 is a graph showing the generated accelerations of the right and left haptic presentation units 4R and 4L in the case where those obtained by amplitude values to be given to the right and left haptic presentation units 4R and 4L by a gain less than 0 dB are given.

By multiplying amplitude values to be given to the right and left haptic presentation units 4R and 4L having different resonant frequencies by a gain less than 0 dB to selectively attenuate (suppress) the components close to the resonant frequencies of the right and left haptic presentation units 4R and 4L in this way, it is possible to make the generated accelerations of the right and left haptic presentation units 4R and 4L close to each other.

Second Embodiment

Although preparation information is generated to adjust vibration data in the information processing apparatus 100 that is a game controller in the above-mentioned first embodiment, preparation information is generated to adjust vibration data in a game console body (hereinafter, referred to as the "game console").

The game console includes hardware such as a controller, a network interface, a controller interface, a media access module, and storage. The controller includes a CPU (Central Processing Unit) for performing arithmetic processing, and a memory such as a RAM and a ROM. The memory and the storage store a control program, a game program, and the like executed by the CPU.

Figure 20:
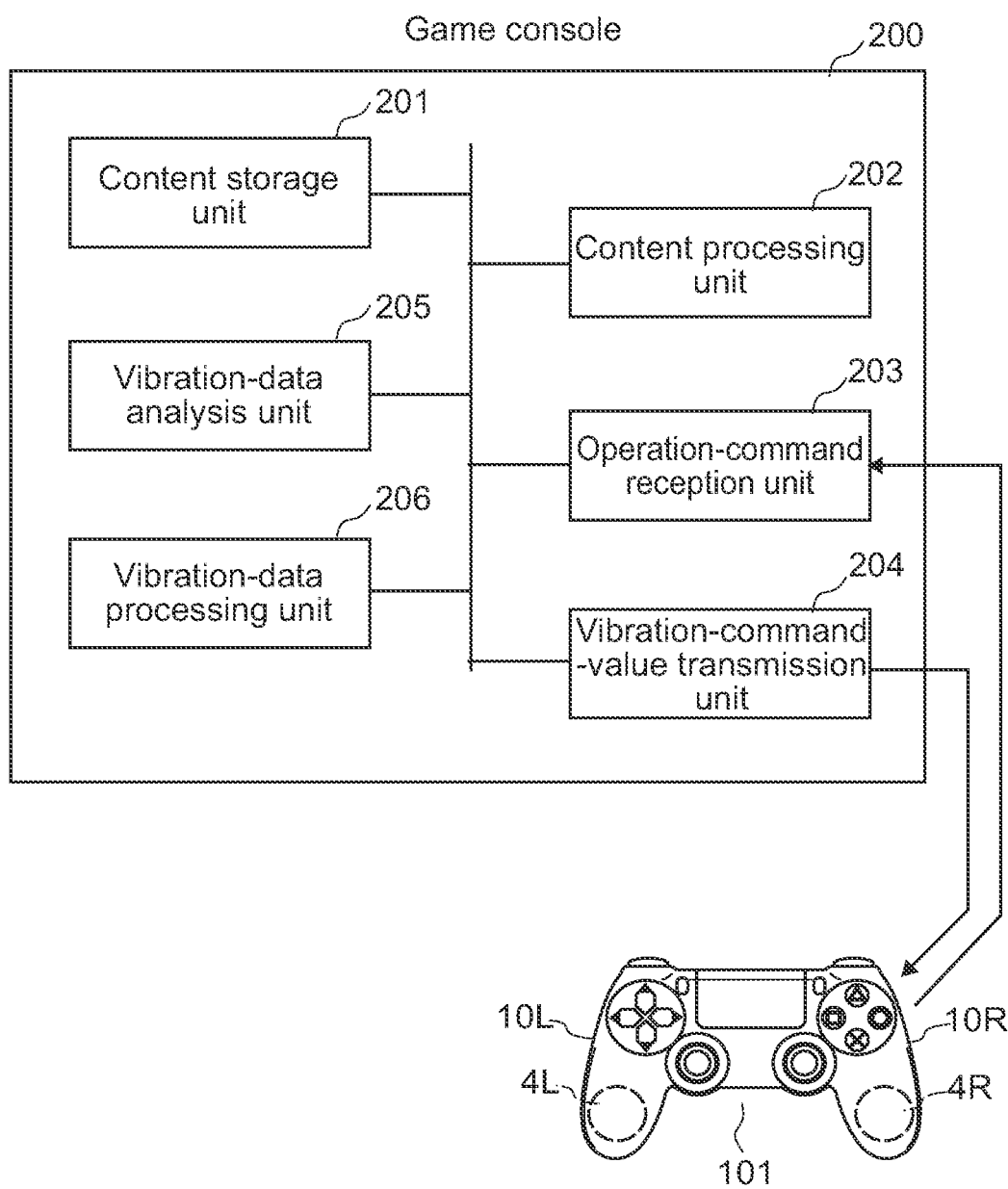
FIG. 20 is a block diagram showing a configuration of a system of a game console according to a second embodiment of the present technology.

FIG. 20 is a block diagram showing a configuration of system by a controller of a game console and a control program.

As shown in the figure, a game console 200 includes a content storage unit 201, a content processing unit 202, an operation-command reception unit 203, a vibration-command-value transmission unit 204, a vibration-data analysis unit 205, and a vibration-data processing unit 206.

The content storage unit 201 loads content data of a medium into the memory. Here, the content data is a game program including vibration data, or the like.

The operation-command reception unit 203 receives, via an interface, a command corresponding to a button operation from a game controller 101, and transmits the received command to the content processing unit 202.

The content processing unit 202 processes the content data loaded into the memory in accordance with, for example, the command from the game controller 101 received by the operation-command reception unit 203 to generate video and audio, and outputs the generated video and audio to a display unit and a speaker (not shown). Further, the content processing unit 202 reads the vibration data in accordance with the processing of content data, and supplies the read vibration data to the vibration-data analysis unit 205.

The vibration-data analysis unit 205 analyzes the vibration data supplied from the content processing unit 202 to separate the mode flag and the left vibration command value and the right vibration command value, and transmits them to the vibration-data processing unit 206.

The vibration-data processing unit 206 generates and holds preparation information on the basis of the information regarding the frequency characteristics of the left and right haptic presentation units 4L and 4R of the game controller 101. The vibration-data processing unit 206 adjusts, on the basis of the result of determining the mode and preparation information acquired from the vibration-data analysis unit 205, at least one of the left vibration command value 42 or the vibration command value 43 in the case of the right-and-left interlocking mode (with correction) or the right-and-left independent mode (with correction), as in the first embodiment.

The vibration-command-value transmission unit 204 transmits, by wireless communication or wired communication, the vibration command values for the right and left haptic presentation units 4R and 4L generated by the vibration-data processing unit 206 to the game controller 101.

In this game console 200 according to the second embodiment, the content processing unit 202 reads the vibration data from the memory in the game console 200 in accordance with the processing of content, and the vibration-data analysis unit 205 determines the mode on the basis of the mode flag included in the vibration data. The vibration-data processing unit 206 generates preparation information on the basis of the information regarding the frequency characteristics of the left and right haptic presentation units 4L and 4R of the game controller 101, and adjusts, in the case where the result of determining the mode is the right-and-left interlocking mode (with correction) or the right-and-left independent mode (with correction), at least one of the left vibration command value 42 or the vibration command value 43 on the basis of the preparation information. The right and left vibration command values obtained by the vibration-data processing unit 206 are transmitted to the game controller 101 by the vibration-command-value transmission unit 204, and haptic presentation by the left and right haptic presentation units 4L and 4R of the game controller 101 is performed.

Modified Example 1

Although the embodiments in which the present technology is applied to a game controller and a game console body have been described above, the present technology may be applied to a server apparatus.

The game controller or the game console body is connected to the server apparatus via a network. Here, description is made assuming that the server apparatus is connected to the game console via a network.

Figure 21:
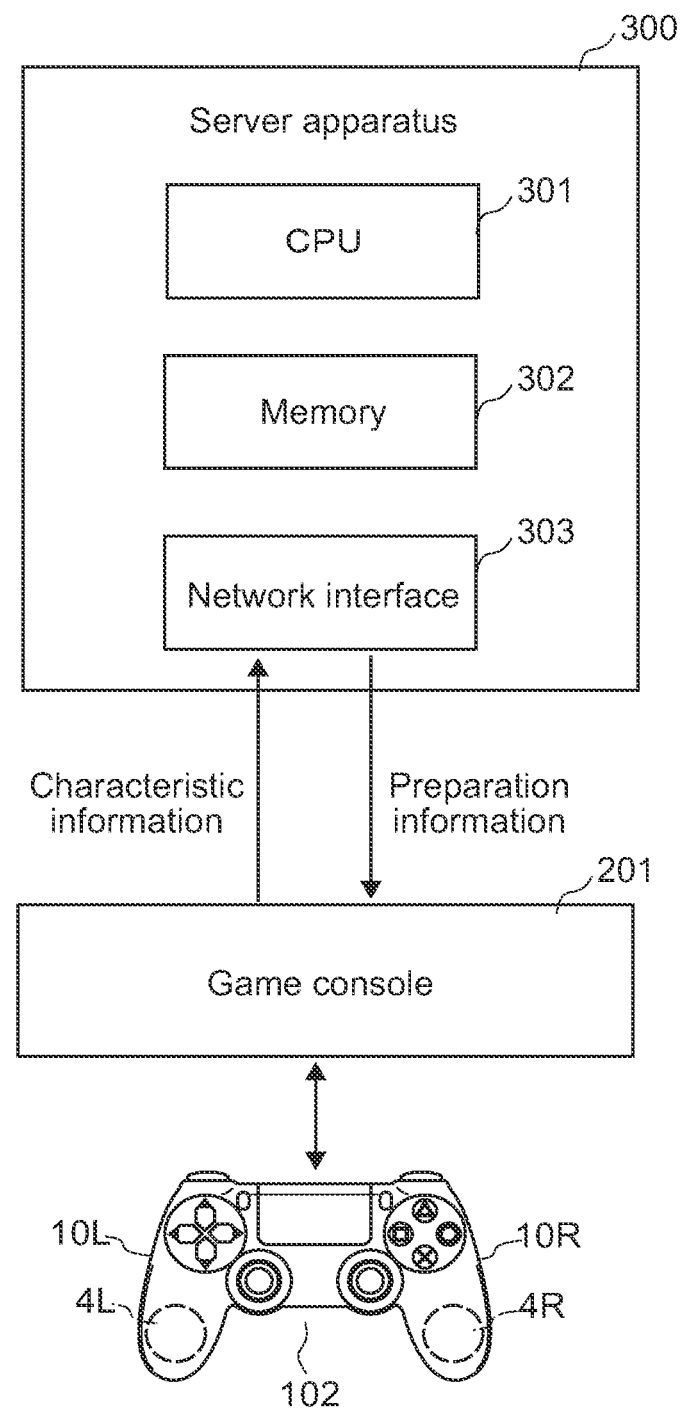
FIG. 21 is a block diagram showing a configuration of a system of a server apparatus according to a modified example of the present technology.

FIG. 21 is a diagram showing a configuration of a system of a server apparatus 300.

The server apparatus 300 includes a CPU 301, a memory 302, a network interface 303, and the like.

The CPU 301 of the server apparatus 300 generates, on the basis of characteristic information items of the right and left haptic presentation units 4R and 4L having different characteristics mounted on a game controller 102, preparation information items to be used by the right and left haptic presentation units 4R and 4L to perform haptic presentation to a user, on the basis of the program stored in the memory 302.

That is, the CPU 301 of the server apparatus acquires, when receiving a request for acquiring preparation information from a game console 201 connected via a network, characteristic information items regarding, for example, the frequency characteristics of the right and left haptic presentation units 4R and 4L of the game controller 102 from the game console 201, generates, on the basis of the characteristic information items, preparation information items to be used by the right and left haptic presentation units 4R and 4L of the game controller 102 to perform haptic presentation to a user, and transmits the generated preparation information items to the game console 201 via a network using the network interface 303.

The game console 201 stores the preparation information received from the server apparatus 300 in the memory. Here, when a non-volatile memory is used as the memory that stores preparation information, there is no need to request the server apparatus 300 for generating and distributing preparation information as long as there is no change in the game controller or the right and left haptic presentation units 4R and 4L mounted on the game controller.

As described in the above-mentioned second embodiment, in the game console 201, the content processing unit 202 reads the vibration data from the memory in the game console 200 in accordance with the processing of content, and the vibration-data analysis unit 205 determines the mode on the basis of the mode flag included in the vibration data. The vibration-data processing unit 206 adjusts, in the case where the result of determining the mode is the right-and-left interlocking mode (with correction) or the right-and-left independent mode (with correction), at least one of the left vibration command value or the right vibration command value on the basis of the preparation information stored in the memory. The right and left vibration command values obtained by the vibration-data processing unit 206 are transmitted to the game controller 101 by the vibration-command-value transmission unit 204, and haptic presentation by the left and right haptic presentation units 4L and 4R of the game controller 101 is performed.

Modified Example 2

A server apparatus according to a modified example 2 acquires characteristic information items of the right and left haptic presentation units 4R and 4L of the game controller, generates, on the basis of the characteristic information items, preparation information items to be used by the right and left haptic presentation units 4R and 4L of the game controller to perform haptic presentation to a user, and supplies only the preparation information items to the game console. However, the present technology is applicable also to a server apparatus that executes a game program and supplies video, audio, and vibration data relating thereto to the game console via a network.

Note that the server apparatus according to the modified example 1 and the server apparatus according to the modified example 2 may include a single server apparatus or a plurality of server apparatuses.

Further, the server apparatus is not necessarily one that acquires characteristic information items of the right and left haptic presentation units 4R and 4L of the came controller from the game console and generates preparation information items, and may generate preparation information items by, for example, searching a database for characteristic information items of the right and left haptic presentation units 4R and 4L of a game controller that can be connected to the game console from an apparatus ID assigned to the game console.

Modified Example 3

Although those presenting vibration to a use have been described above as the right and left haptic presentation units 4R and 4L mounted on the game controller, the present technology is similarly applicable also to those presenting pressure to a user.

Further, the right and left haptic presentation units 4R and 4L does not necessarily need to employ the same type of vibrator. For example, one of the right and left haptic presentation units 4R and 4L may be a voice coil motor and the other may be a vibration motor other than the voice coil motor.

Modified Example 4

Further, the present technology is not necessarily need to be applied to a game controller capable of giving a user haptic presentation.

For example, the present technology is applicable to various forms of information processing apparatuses on which a haptic presentation unit is mounted, such as a laptop computer, a smartphone, a tablet terminal, a mobile telephone, a head-mounted display, and other wearable mobile devices.

Modified Example 5

Further, the present technology is not limited to an information processing apparatus on which two haptic presentation units are mounted, and is applicable also to an apparatus on which three or more haptic presentation units are mounted.

Modified Example 6

Figure 22:
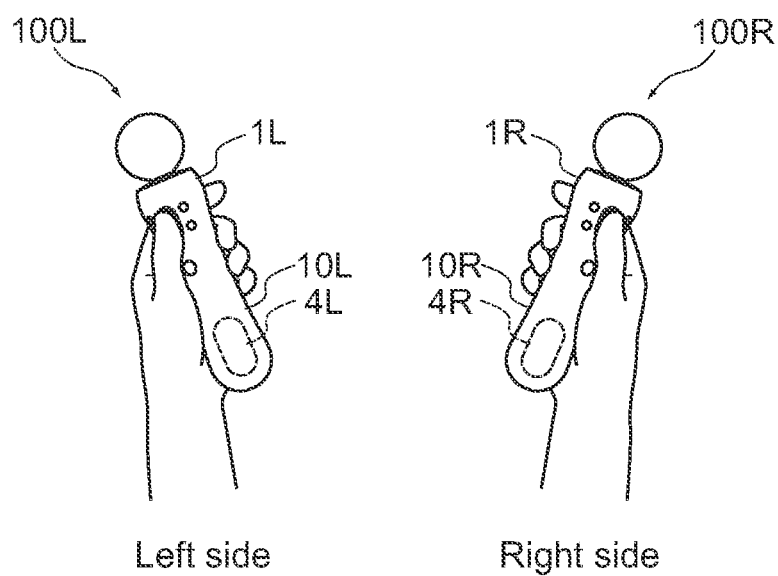
FIG. 22 is a diagram showing another modified example according to the present technology.

Further, the present technology is applicable also to, for example, a set of information processing apparatuses 100L and 100R that include a plurality of independent main bodies 1L and 1R including grip portions 10L and 10R that can be held by the left and the right hand of a user in which the plurality of haptic presentation units 4L and 4R is individually disposed on the grip portions 10L and 10R of the plurality of main bodies 1L and 1R, as shown in FIG. 22.

Although a favorable embodiment and the like of the present technology have been described in detail with reference to the accompanying drawings, the technical scope of the present disclosure is not limited to such an example. It will be apparent to those skilled in the art of technical field of the present technology that various changes or modifications may be made within the scope of technical idea set forth in the appended claims, which are of course understood to fall within technical scope of the present technology.

In addition, the effects described in the present specification are merely descriptive or illustrative and not restrictive. In other words, the technology according to the present technology may have other effects apparent to those skilled in the art from the description herein together with the above-mentioned effects or in place of the above-mentioned effects.

Note that the following configuration also belongs to technical scope of the present technology.

(1) An information processing apparatus, including:
   a generation unit that generates, on a basis of characteristic information items of a plurality of haptic presentation units having different characteristics, preparation information items to be used by the plurality of haptic presentation units to perform haptic presentation to a user.

(2) The information processing apparatus according to (1) above, in which the generation unit generates, on a basis of the characteristic information items, the preparation information for at least one haptic presentation unit of the plurality of haptic presentation units such that common haptic presentation is performed between the plurality of haptic presentation units.

(3) The information processing apparatus according to (1) or (2) above, in which
the characteristic of the haptic presentation unit is a frequency characteristic.

(4) The information processing apparatus according to any one of (1) to (3) above, in which
the preparation information includes a parameter for adjustment to a command value for controlling the haptic presentation unit.

(5) The information processing apparatus according to any one of (1) to (4) above, in which
the preparation information includes an inverse function of the characteristic of the haptic presentation unit.

(6) The information processing apparatus according to any one of (1) to (5) above, in which
at least one of the plurality of haptic presentation units is a linear vibration actuator.

(7) The information processing apparatus according to (6) above, in which
the linear vibration actuator is a voice coil motor.

(8) The information processing apparatus according to any one of (1) to (7) above, further including
a main body including two grip portions that can be held by a user, in which
the plurality of haptic presentation units is individually disposed on the plurality of grip portions.

(9) The information processing apparatus according to any one of (1) to (7) above, further including
a plurality of independent main bodies each including a grip portion that can be held by a user, in which
the plurality of haptic presentation units is individually disposed on the grip portions of the plurality of main bodies.

(10) The information processing apparatus according to any one of (1) to (9) above, in which
the generation unit generates, on a basis of the characteristic information, the preparation information for at least one haptic presentation unit of the plurality of haptic presentation units such that common haptic presentation is performed in a middle of presentation of a sense of movement in which a haptic presentation position continuously changes among the plurality of haptic presentation units.

(11) The information processing apparatus according to any one of (1) to (9) above, in which
the generation unit generates, on a basis of the characteristic information, the preparation information for at least one haptic presentation unit of the plurality of haptic presentation units such that haptic presentation at a particular frequency by at least one haptic presentation unit of the plurality of haptic presentation units is suppressed.

(12) The information processing apparatus according to (11) above, in which
the particular frequency is a resonant frequency of the at least one haptic presentation unit.

(13) An information processing method, including:
generating, by a generation unit on a basis of characteristic information items of a plurality of haptic presentation units having different characteristics, preparation information items to be used by the plurality of haptic presentation units to perform haptic presentation to a user.

(14) The information processing method according to (13) above, in which
the generation unit generates, on a basis of the characteristic information items, the preparation information for at least one haptic presentation unit of the plurality of haptic presentation units such that common haptic presentation is performed between the plurality of haptic presentation units.

(15) The information processing method according to (13) or (14) above, in which
the characteristic of the haptic presentation unit is a frequency characteristic.

(16) The information processing method according to any one of (13) to (15) above, in which
the preparation information includes a parameter for adjustment to a command value for controlling the haptic presentation unit.

(17) The information processing method according to any one of (13) to (16) above, in which
the preparation information includes an inverse function of the characteristic of the haptic presentation unit.

(18) The information processing method according to any one of (13) to (17) above, in which
at least one of the plurality of haptic presentation units is a linear vibration actuator.

(19) The information processing method according to (18) above, in which
the linear vibration actuator is a voice coil motor.

(20) The information processing method according to any one of (13) to (19) above, in which
the plurality of haptic presentation units is individually disposed on two grip portions that can be held by a user.

(21) The information processing method according to any one of (13) to (19) above, in which
the plurality of haptic presentation units is individually disposed on grip portions of a plurality of independent main bodies each including the grip portion that can be held by a user.

(22) The information processing method according to any one of (13) to (21) above, in which
the generation unit generates, on a basis of the characteristic information, the preparation information for at least one haptic presentation unit of the plurality of haptic presentation units such that common haptic presentation is performed in a middle of presentation of a sense of movement in which a haptic presentation position continuously changes among the plurality of haptic presentation units.

(23) The information processing method according to any one of (13) to (21) above, in which
the generation unit generates, on a basis of the characteristic information, the preparation information for at least one haptic presentation unit of the plurality of haptic presentation units such that haptic presentation at a particular frequency by at least one haptic presentation unit of the plurality of haptic presentation units is suppressed.

(24) The information processing method according to (23) above, in which
the particular frequency is a resonant frequency of the at least one haptic presentation unit.

(25) A program that causes a computer to function as:
a generation unit that generates, on a basis of characteristic information items of a plurality of haptic presentation units having different characteristics, preparation information items to be used by the plurality of haptic presentation units to perform haptic presentation to a user.

(26) The program according to (25) above, in which the generation unit generates, on a basis of the characteristic information items, the preparation information for at least one haptic presentation unit of the plurality of haptic presentation units such that common haptic presentation is performed between the plurality of haptic presentation units.

(27) The program according to (25) or (26) above, in which
the characteristic of the haptic presentation unit is a frequency characteristic.

(28) The program according to any one of (25) to (27) above, in which
the preparation information includes a parameter for adjustment to a command value for controlling the haptic presentation unit.

(29) The program according to any one of (25) to (28) above, in which
the preparation information includes an inverse function of the characteristic of the haptic presentation unit.

(30) The program according to any one of (25) to (29) above, in which
at least one of the plurality of haptic presentation units is a linear vibration actuator.

(31) The program according to (30) above, in which
the linear vibration actuator is a voice coil motor.

(32) The program according to any one of (25) to (31) above, in which
the plurality of haptic presentation units is individually disposed on two grip portions that can be held by a user.

(33) The program according to any one of (25) to (31) above, in which
the plurality of haptic presentation units is individually disposed on grip portions of a plurality of independent main bodies each including the grip portion that can be held by a user.

(34) The program according to any one of (25) to (33) above, in which
the generation unit generates, on a basis of the characteristic information, the preparation information for at least one haptic presentation unit of the plurality of haptic presentation units such that common haptic presentation is performed in a middle of presentation of a sense of movement in which a haptic presentation position continuously changes among the plurality of haptic presentation units.

(35) The program according to any one of (25) to (33) above, in which
the generation unit generates, on a basis of the characteristic information, the preparation information for at least one haptic presentation unit of the plurality of haptic presentation units such that haptic presentation at a particular frequency by at least one haptic presentation unit of the plurality of haptic presentation units is suppressed.

(36) The program according to (35) above, in which
the particular frequency is a resonant frequency of the at least one haptic presentation unit.

REFERENCE SIGNS LIST 4R,4L haptic presentation unit
10R,10L grip portion
31 main control unit
100 information processing apparatus
200 game console
206 vibration-data processing unit

The invention claimed is:
1. An information processing apparatus, comprising:
a first haptic presentation unit;
a second haptic presentation unit, wherein
 each of the first haptic presentation unit and the second haptic presentation unit are configured to perform haptic presentation to a user;
a generation unit configured to:
 generate, based on characteristics of the first haptic presentation unit and the second haptic presentation unit, preparation information for at least one of the first haptic presentation unit or the second haptic presentation unit, wherein
  the first haptic presentation unit and the second haptic presentation unit have different characteristics; and
 adjust a vibration command value of the first haptic presentation unit, wherein
  the adjustment is based on multiplication of the vibration command value of the first haptic presentation unit with the preparation information.

2. The information processing apparatus according to claim 1, wherein the generation unit is further configured to generate, based on the characteristics, the preparation information such that common haptic presentation is performed between the first haptic presentation unit and the second haptic presentation unit.

3. The information processing apparatus according to claim 1, wherein
a first characteristic of the first haptic presentation unit is a first frequency characteristic, and
a second characteristic of the second haptic presentation unit is a second frequency characteristic, and
the characteristics includes the first characteristic and the second characteristic.

4. The information processing apparatus according to claim 1, wherein
the preparation information includes:
 a first inverse function of a first characteristic of the first haptic presentation unit, and
 a second inverse function of a second characteristic of the second haptic presentation unit.

5. The information processing apparatus according to claim 1, wherein at least one of the first haptic presentation unit or the second haptic presentation unit is a linear vibration actuator.

6. The information processing apparatus according to claim 5, wherein the linear vibration actuator is a voice coil motor.

7. The information processing apparatus according to claim 1, further comprising a main body including two grip portions that can be held by the user, wherein
the first haptic presentation unit is on a first grip portion of the two grip portions and the second haptic presentation unit on a second grip portion of the two grip portions.

8. The information processing apparatus according to claim 1, further comprising a plurality of independent main bodies each including two grip portions that can be held by the user, wherein the first haptic presentation unit is on a first grip portion of the two grip portions and the second haptic presentation unit is on a second grip portion of the two the grip portions.

9. The information processing apparatus according to claim 1, wherein the generation unit is further configured to generate, based on the characteristics, the preparation information such that common haptic presentation is performed in a middle of presentation of a sense of movement in which a haptic presentation position continuously changes among the first haptic presentation unit and the second haptic presentation unit.

10. The information processing apparatus according to claim 1, wherein the generation unit is further configured to generate, based on the characteristics, the preparation information that haptic presentation at a particular frequency by at least one of the first haptic presentation unit or the second haptic presentation unit is suppressed.

11. The information processing apparatus according to claim 10, wherein the particular frequency is a resonant frequency of the at least one of the first haptic presentation unit or the second haptic presentation unit.

12. An information processing method, comprising:
presenting, by each of a first haptic presentation unit and a second haptic presentation unit, haptic presentation to a user;
generating, by a generation unit, based on characteristics of the first haptic presentation unit and the second haptic presentation unit, preparation information for at least one of the first haptic presentation unit or the second haptic presentation unit, wherein
the first haptic presentation unit and the second haptic presentation unit have different characteristics; and
adjusting, by the generation unit, a vibration command value of the first haptic presentation unit, wherein
the adjustment is based on multiplication of the vibration command value of the first haptic presentation unit with the preparation information.

13. A non-transitory computer-readable medium having stored thereon, computer-executable instructions which, when executed by a processor of an information processing apparatus, cause the processor to execute operations, the operations comprising:
presenting, by each of a first haptic presentation unit and a second haptic presentation unit, haptic presentation to a user;
generating, by a generation unit, based on characteristics of the first haptic presentation unit and the second haptic presentation unit, preparation information for at least one of the first haptic presentation unit or the second haptic presentation unit, wherein
the first haptic presentation unit and the second haptic presentation unit have different characteristics; and
adjusting, by the generation unit, a vibration command value of the first haptic presentation unit, wherein
the adjustment is based on multiplication of the vibration command value of the first haptic presentation unit with the preparation information.

* * * * *